3,453,431
MODULATION AND AMPLIFICATION OF ELECTROMAGNETIC RADIATION BY IMPACT IONIZATION
Saul R. Lederhandler, Somerville, N.J., assignor to The Micro State Electronics Corporation, Murray Hill, N.J., a corporation of Delaware
Filed Mar. 29, 1966, Ser. No. 538,287
Int. Cl. G01t 1/16
U.S. Cl. 250—83.3                                9 Claims

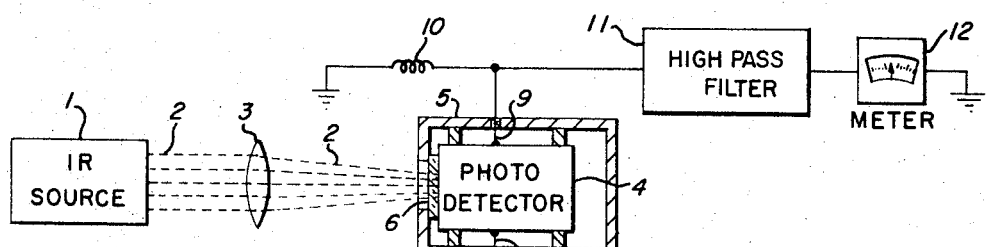
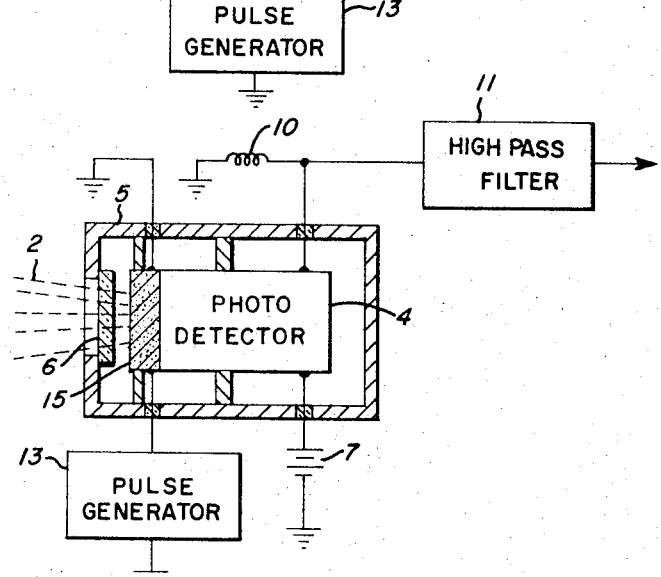
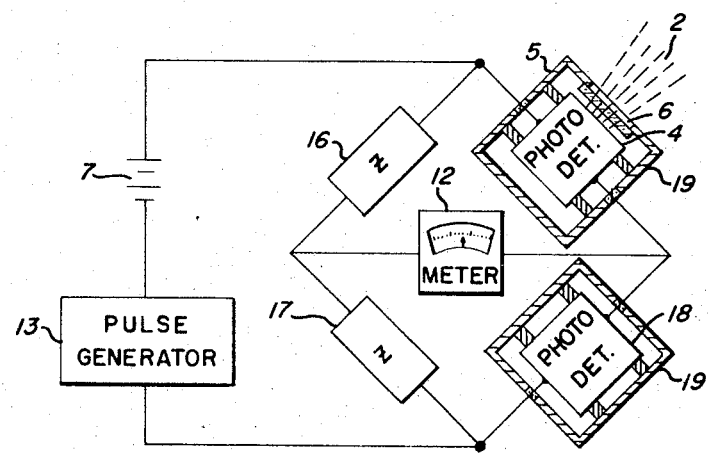

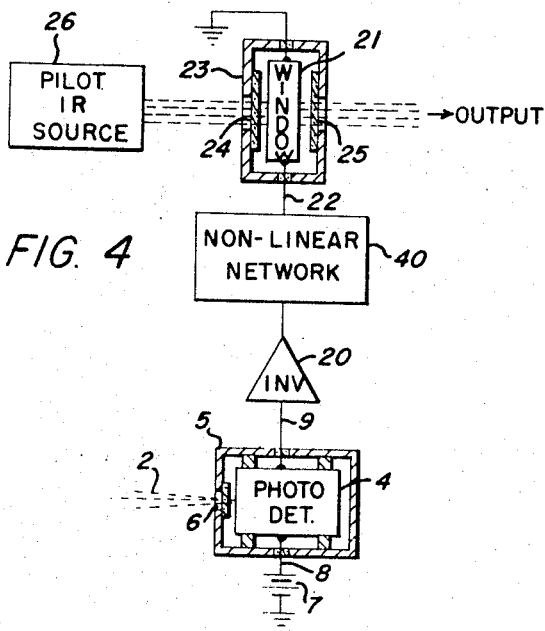
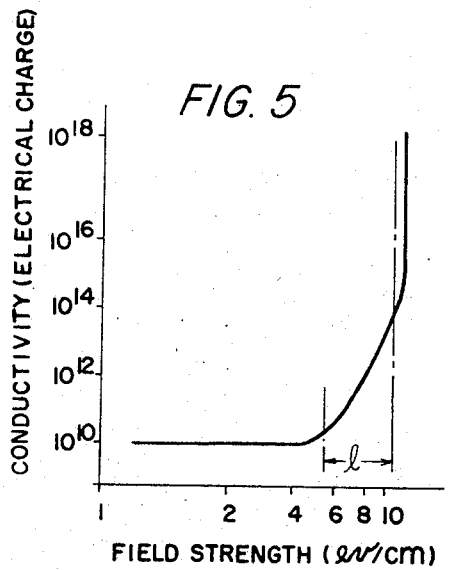
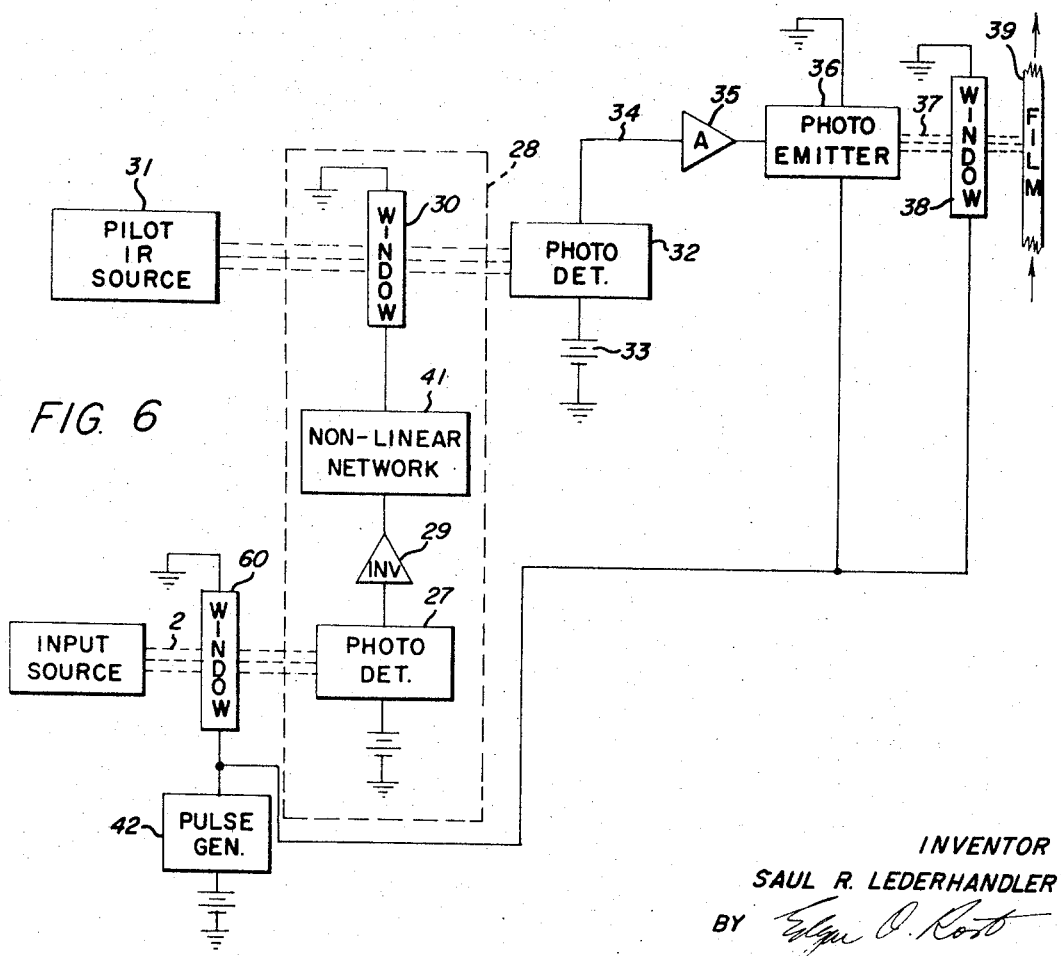

ABSTRACT OF THE DISCLOSURE

Apparatus for detecting, modulating and amplifying electromagnetic radiation in the infrared spectrum. The invention utilizes the phenomenon called impact ionization wherein semiconductor materials of varying impurity concentration at extremely low temperatures will act as an infrared detector unless the impurities are in an ionized state through the influence of low electric fields. When the electric field is equal to or exceeds the critical breakdown voltages the unionized impurities that normally would respond to infrared radiation are now ionized and render the detector opaque and insensitive to the infrared radiation. The sensitivity of the photodetector may therefore be modulated by a pulse generator in such a manner that the detector will be alternately in the ionized and unionized condition to thereby provide an electrical modulation technique for use in infrared detection systems. Numerous configurations and combinations utilizing the disclosed impact ionization phenomenon are described for modulation of infrared energy.

---

This invention relates to semiconductor valves for controlling electromagnetic wave energy, and more particularly, although in its broader aspects not exclusively, to apparatus for detecting, modulating and amplifying electromagnetic radiation in the infrared spectrum.

Crystalline semiconductors such as silicon and germanium are known to be optically transparent to electromagnetic waves in the infrared portion of the spectrum which have greater than a threshold wavelength. This characteristic arises partially from the atomic structure of the crystals, and partially from certain energy relationships which exist within the crystals. More particularly, individual semiconductor atoms comprise only four valence electrons in their outer or valence ring, thereby leaving a vacancy in this ring of four electrons. Each atom fills its electron vacancies, or holes, by borrowing on a shared basis a single electron from each of four neighboring atoms. Similarly, the four valence electrons of the original atom are borrowed to fill a single electron vacancy in each of the four neighboring atoms. In this manner a rectangular lattice structure is formed in which each atom is bonded to four neighboring atoms by four pairs of shared electrons. Associated with each shared electron is a specific quantum of energy occupying a narrow region in the energy spectrum known as the filled band. In order for an electron to disassociate from its bond it is necessary for that electron to absorb sufficient energy to be elevated to a region in the energy spectrum known as the conduction band. Electrons cannot exist at energy levels lying between the filled and conduction bands, and consequently this region is generally termed the forbidden band. An electron in the conduction band, however, may reside at a great multitude of energy levels, or in other words, an electron having reached the conduction band may thereafter absorb many different quantums of energy.

Different semiconductor materials have different forbidden band widths at certain threshold wavelengths above which they will transmit electromagnetic radiation and below which they will absorb substantially all of the impinging radiation. Moreover, the forbidden bandwidths and threshold wavelengths vary somewhat with temperature. The values of the forbidden bandwidths in electron volts and threshold wavelengths for typical semiconductor materials are presented below for two different temperature levels, namely 300° K. and 0° K.

| | Energy gaps | | | |
|---|---|---|---|---|
| | 300° K. | | 0° K. | |
| Material | Ev. | Wavelength in microns | Ev. | Wavelength in microns |
| InSb | .17 | 7.35 | .25 | 5.0 |
| InAs | .33 | 3.79 | .45 | 2.78 |
| GaAs | 1.45 | .863 | 1.53 | 8.17 |
| Ge | .65 | 1.925 | .75 | 1.67 |
| Si | 1.08 | 1.16 | 1.14 | 1.09 |
| InP | 1.25 | 1.0 | 1.34 | .935 |
| GaSb | .67 | 1.87 | .80 | 1.57 |
| AlSb | 1.6 | .78 | 1.7 | .735 |
| GaP | 2.24 | .558 | 2.4 | .521 |
| AlP | 3.0 | .416 | | |

Of course, if impurities are present, in which case an excess of electrons exist if the impurity is a donor and an excess of holes exist if the impurity is an acceptor, the forbidden bands are narrowed and the threshold wavelengths correspondingly decreased. Electromagnetic waves which have greater than the threshold wavelength for a specific crystal do not possess sufficient releasable energy to raise a shared electron of that crystal from the filled band to the conduction band. Since electrons cannot exist at energy levels lying between these bands, as aforementioned, such waves are transmitted through the semiconductor material with substantially undiminished energy. In other words, such crystals are essentially transparent to infrared energy or other frequency electromagnetic radiation of greater than threshold wavelength. When impurities are presented which narrow the width of the forbidden band, however, radiation of this same wavelength is sufficient to raise the energy level of a shared electron to the conduction band. As a result, the bond formerly maintaining the raised electron in its two-atom system is broken, and the electron is free to travel through the lattice under the influence of an externally applied field. Thus, semiconductor crystals are useful not only as transparent windows, but as infrared photodetectors as well.

At extremely low temperatures, say in the range of 8° K. to 80° K., semiconductor crystals of varying impurity concentrations have been found to exhibit a reversible, nondestructive ionization effect under the influence of relatively low electric fields, for example in the range of 5 to 500 electron volts/cm. This phenomena manifests itself as a sharp increase of several orders of magnitude in the number of free, or nonbonded, charge carriers in the crystals, and consequently, as a corresponding increase in crystal current. It is believed that such ionization is caused by free charge carriers, which gain kinetic energy from the applied field, colliding with and freeing additional charge carriers from the neutral impurities. The free charge carriers are able to gain sufficient kinetic energy to cause ionization by impact owing to their high mobility at low temperatures.

In accordance with the present invention, the above described ionization phenomena, hereinafter referred to as "impact ionization," is utilized in a unique manner to provide selective detection, modulation and amplification of electromagnetic waves, particularly those in the infrared region. Accordingly, one aspect of the invention concerns an infrared detector in which on-off type modulation is effected by electronic rather than mechanical means. Another aspect of the invention pertains to an arrangement for increasing the signal-to-noise ratio in an electronically modulated infrared detector. Another aspect of the invention relates to apparatus for amplifying infrared input signals. Still another aspect of the invention concerns an infrared surveillance system in which detected infrared waves are recorded in mosaic form on a photosensitive surface such as a filmstrip.

One object of the invention is to reduce the cost of and bulk of presently available infrared detection systems.

Another object of the invention is to sample infrared signals at considerably higher rates than was heretofore practicable.

Still another object of the invention is to amplify electromagnetic wave energy, particularly in the infrared region of the frequency spectrum.

The foregoing and other objects, features and advantages of the invention will be more thoroughly understood by reference to the following detailed description of several different embodiments of the invention in conjunction with the accompanying drawing in which:

FIG. 1 is a basic embodiment of a modulated detector constructed in accordance with the principles of the invention;

FIGS. 2 and 3 show circuit arrangements employing the present invention for increasing the signal to noise ratios in modulated infrared detectors;

FIG. 4 shows an amplifier for electromagnetic waves in the infrared region of the frequency spectrum;

FIG. 5 is a graph useful in explaining the invention;

FIG. 6 illustrates an infrared surveillance system employing the principles of the present invention.

Throughout the drawing the same elements shown in different figures are designated by the same reference numerals.

Figure 7:
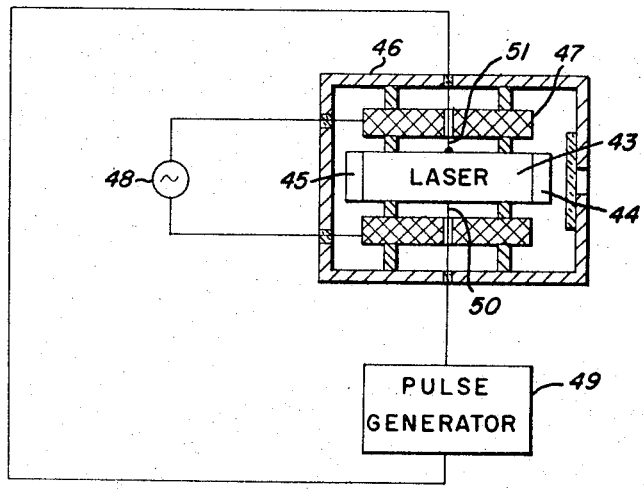
FIG. 7 illustrates a circuit arrangement in which the principles of the present invention are applied to laser devices.

With reference to the drawing, FIG. 1 illustrates a basic embodiment of the invention in which a source of infrared radiation 1 emits infrared rays 2 which are focused by an objective 3 on the surface of a photodetector 4. Photodetector 4 is mounted in a Dewar vessel 5 or on a cold head of a cryogenic engine which maintains its temperature at an extremely low value, for example in the range of 8° K. to 35° K. Dewar vessel 5 includes a window 6 through which infrared rays 2 are transmitted to the photodetector. By way of illustration, but not limitation, photodetector 4 may comprise crystalline germanium having an impurity concentration of approximately $5 \times 10^{13}$ mercury atoms per cubic centimeter. Photodetector 4 is biased to its optimum detectivity by a circuit which includes battery 7, terminals 8 and 9 of the photodetector and choke coil 10. If desired, the window may be provided with certain filtering properties to restrict the wavelength of radiation passing therethrough to only those wavelengths which activate the photodetector. In the alternative, the photodetector itself may be coated with a filter to perform this function.

When infrared rays 2 impinge upon photodetector 4, sufficient energy is absorbed by the loosely bonded excess electrons of the impurity atoms to elevate these electrons into the conduction band. As a result the conductivity of the photodetector, which is directly proportional to the number of free electrons, is modulated at the frequency of the pulse generator 13. As a consequence an output current which is proportional to the strength of infrared rays 2 is produced at electrodes 8 and 9, translated through high pass filter 11, and is measured quantitatively by a convenient device such as meter 12. In the alternative the output from photodetector 2 could be supplied to a photoemitter which will produce electromagnetic radiations proportional to the output of the photodetector which may be directed at light sensitive film. Other means of utilizing the output of the photodetector will be readily apparent to those skilled in the art.

In accordance with the invention, the sensitivity of photodetector 4 to infrared rays 2 is modulated by a pulse generator 13 which creates a sufficient electric field between electrodes 8 and 9 to cause impact ionization. As explained above, when impact ionization occurs the number of free electrons in photodetector 4 is sharply increased. Since each of these free electrons is in the conduction band, and hence able to absorb many different quanta of energy, substantially all of the energy present in the impinging infrared radiation is expended in raising free electrons to higher levels in the conduction band rather than in freeing bonded electrons. During the state of ionization, therefore, the conductivity, and hence the current, of photoconductor 4 is sharply increased from its unionized value. This current is rejected by high-pass filter 11, and consequently is not detectable by output means such as meter 12. It has been found that semiconductor crystals such as photodetector 4 can be transformed in and out of the ionized state at very high rates, much faster, for example, than the exposure of a photodetector to radiation can be varied by mechanical chopper means. The present invention, therefore, provides a convenient means for increasing the sampling rate of infrared detectors.

FIG. 2 illustrates a modulator-detector arrangement having a somewhat better signal-to-noise ratio than the embodiment shown in FIG. 1. The improved signal-to-noise ratio of this arrangement arises by virtue of the photoconductive element 4 not being raised to the ionization state as it was in the configuration of FIG. 1. In the improved arrangement of FIG. 2 a window 15 of semiconductive material is interposed between photodetector 4 and window 6 through which impinging radiation 2 enters Dewar vessel 5. Advantageously, window 15 is sufficiently free of impurities to be entirely transparent to infrared radiation in the region of interest when unionized. In accordance with the invention, the transparency of window 15 to infrared radiation is modulated by pulse generator 13 which creates a sufficient electric field across window 15 to cause impact ionization. Thus the number of free carriers is so great as to absorb the photon energy carried by the impinging infrared rays 2. Thus, sufficient energy does not penetrate through window 15 to activate the photoconductor 4. It has been found that by not subjecting the photoconductive element 4 to impact ionization, a marked increase in signal-to-noise ratio is obtained.

FIG. 3 shows the invention arranged in a bridge configuration which is particularly advantageous in reducing the noise internally generated in semiconductor photodetectors. As shown, substantially equal impedances 16 and 17 comprise two adjacent arms of the bridge, while the other two adjacent arms comprise semiconducting photodetecting elements 4 and 18. Preferably, photodetectors 4 and 18 are substantially identical in composition, and are maintained at uniformly low temperatures by Dewar vessels 5 and 19. As in the arrangements of FIGS. 1 and 2, Dewar vessel 5 of FIG. 3 includes a window 6 through which incident infrared rays 2 gain access to photodetector 4. Dewar vessel 19, however, is completely sealed or shielded from infrared radiation, thereby allowing photodetector 18 to emit a signal proportional only to its internally generated noise. Both bias potential from battery 7 and modulating pulses from pulse generator 13 are applied to the bridge across the junctions of impedance 16 and photodetector 4 and of impedance 17 and photodetector 18. The output signal of the bridge, which is a measure of the incident infrared rays 2, is sensed across the remaining two junctions of the bridge by an appropriate device such as meter 12 or a photoemitter or any other suitable device.

If the photodetectors 4 and 18 are substantially matched, the output signal detected by meter 12 due to internal noise is nulled by the bridge configuration and only the signal from photodetector 4 due to impinging infrared rays 2 is measured. When generator 13 emits a pulse, which in this case must be sufficient to produce impact ionization in both photodetectors, the current through the right-hand side of the bridge increases sharply, but the component of the output signal from photoconductor 4 due to impinging infrared radiation is substantially eliminated. Consequently, during the interval of impact ionization the output signal of the bridge measured by meter 12 is nulled in the same manner as the internal noise.

FIG. 4 shows the invention embodied in an arrangement adapted to provide an amplified replica of an input infrared signal. As shown, input infrared rays 2 are transmitted through window 6 in Dewar vessel 5 and impinge upon photodetector 4, thereby producing an output signal which is proportional to the strength of input rays 2. The output signal on terminal 9 of the photodetector 4 is applied to terminal 22 of window 21 through an inverter 20 and a predistortion network 40 of conventional design having a nonlinear transfer function which will be discussed in greater detail below. In construction, window 21 is substantially similar to element 15 of FIG. 2, and likewise is highly transparent to infrared radiation when not ionized. Window 21 is maintained at a low temperature in the range mentioned heretofore by Dewar vessel 23 which includes a pair of optically aligned and infrared transparent windows 24 and 25 in its front and rear surfaces, respectively. A pilot source of infrared energy 26, which is considerably stronger than the level of input rays 2, is disposed so as to direct a beam of infrared rays through window 21 in optical alignment with windows 24 and 25.

FIG. 5 is a graph which illustrates quantitatively the manner in which the conductivity, or number of free electrons, of a semiconductor window 21 varies as a function of electrical field strength. It will be observed that in the region of field strength labeled "1," conductivity varies in a substantially logarithmic manner. In accordance with the principles of the invention the minimum and maximum output levels of inverter 20 are adjusted to lie within the logarithmic region "1," and the transfer function on nonlinear network 40 is complementary to the logarithmic portion of the conductivity versus field strength characteristic. The term complementary transfer function, as used herein, is defined as a transfer function which when combined with another transfer function yields a composite linear transfer function. When the infrared rays 2 impinging upon photodetector 4 are at their weakest level, the output of inverter 20 is maximum, thereby strongly ionizing window 21. As a result, window 21 is substantially opaque to the beam of pilot source 26 and only a very small portion of the infrared beam corresponding to the weak infrared signal 2 is transmitted through window 21. On the other hand, when input rays 2 are at their highest level the output signal of inverter 20 is at minimum value in which case window 21 is substantially not ionized. Consequently, window 21 is highly transparent to infrared radiation and substantially all of the beam from source 26 is transmitted therethrough. As the amplitude of input rays 2 varies between the maximum and minimum limits, an output signal is produced by photodetector 4 having variations which are directly proportional or linear with respect to the variations in the amplitude of rays 2. After inversion by inverter 20 this last-mentioned signal is distorted in passage through network 40 such that its variations when applied to window 21 are no longer linear with respect to the variations of rays 2. Owing to the transfer function of network 40 being complementary to the logarithmic portion of the conductivity vs. field strength characteristic of FIG. 5, however, the conductivity of window 21, under the influence of these distorted signals, and hence its transparency to infrared waves, is modulated in direct proportion to the variations in rays 2. Since the level of the beam from pilot source 26 is considerably stronger than the level of input rays 2, the portion of the beam transmitted through window 21 is an amplified replica of input rays 2. However, the nonlinear network 40 may be eliminated if the window 21 is caused to operate in a very narrow band of field strengths whereby to approximate linear operation.

FIG. 6 illustrates an infrared surveillance system into which are combined the detecting, amplifying and modulating aspects of the invention discussed above. It is to be understood that although not specifically shown in the drawing, all semiconductor elements of the system which are subjected to the impact ionization phenomena as well as other solid state devices therein are mounted in Dewar vessels to maintain these elements at the required low temperatures. As shown, input infrared rays 2 are transmitted through a modulating semiconductive window 60 and impinge upon photodetector 27 which forms the control element of infrared amplifier 28. Amplifier 28 includes an inverter 29, a nonlinear predistortion network 41 and a window 30 through which a beam of infrared energy from pilot infrared source 31 is transmitted in controlled amounts. The beam of infrared energy from pilot source 31 which passes though window 30 impinges upon a photodetector 32. Photodetector 32 is biased to optimum detectivity in the frequency range of interest by battery 33, and the output signals of photodetector 32 which appear on conductor 34 are amplified by amplifier 35 and retransformed into optical energy by a conventional photoemissive device 36. The optical energy 37 emitted by device 36 is transmitted through a modulating window 38 to a suitable register such as filmstrip 39.

Infrared surveillance systems such as the one pictured in FIG. 6 are generally of the scanning type, that is to say, the input rays 2 of these sytems are gathered not from the emission of any one fixed area but rather from a panoramic scan. Consequently, it is desirable from the standpoint of sharp reproduction that filmstrip 39 record an image only when rays 2 arrive from a substantially fixed location and not during the interval that the beam is moving from point to point. In accordance with the invention, this result is accomplished by pulse generator 42 being connected to apply impact ionizing potential to input window 60 and output window 38 simultaneously during a scanning interval. When pulse generator 42 is quiescent, windows 60 and 38 are transparent to infrared waves, and rays 2 gathered from a target are processed and irradiate filmstrip 39. When rays 2 are scanning to an adjacent target area to be photographed, pulse generator 42 is activated. Consequently, windows 60 and 38 are opaque to infrared waves impinging thereon. Since the frequency at which windows 60 and 38 are transposed between the transparent and the opaque conditions is substantially greater than the operating frequency of mechanical shutter-type arrangements, the present invention permits information to be gathered at a much higher rate than heretofore, and with considerably less mechanical equipment.

In the preceding text the invention has been discussed solely in terms of the effects of impact ionization on crystalline semiconductors. It is to be understood, however, that the invention is equally applicable to other crystalline substances. FIG. 7 illustrates the invention embodied in a laser device. As shown, a crystal of suitable laser material 43, having opposing mirrored surfaces 44 and 45, is mounted in a Dewar vessel 46 to maintain the required low temperatures. A light source of pumping energy 47 (shown in cross section) is mounted coaxially with laser crystal 43, and is energized by a source of potential 48. In operation the photon energy from source 47 is absorbed by crystal 43 and causes emission within the crystal of electromagnetic waves. The axial component of these waves is reflected back and forth between mirrored surfaces 44 and 45, during which time the waves build in intensity. When sufficient amplification has taken place, the wave energy is transmitted through one of the mirrored surfaces as a high resolution light beam.

In accordance with the invention a pulse generator 49 is connected through terminals 50 and 51 to crystal 43. Pulse generator 49 is adjusted to generate sufficient potential to cause impact ionization in crystal 43. Accordingly, the output beam of the laser is modulated at the operating frequency of pulse generator 49. In the alternative, a separate modulator window like window 15 in FIG. 2 may be disposed in front of crystal 43 to modulate the output therefrom.

While the preceding specification emphasized the application of the invention especially with electromagnetic radiation in the infrared range, it will be understood that radiation of other frequencies may be employed in connection with the above described invention in accordance with the requirements of threshold frequencies set forth hereinbefore.

In all cases it is to be understood that the embodiments described herein are merely illustrative of the principles of the invention, and may other adaptations or modifications may be derived without departing from the true scope of the invention.

What is claimed is:

1. An infrared radiation detection system comprising, in combination, a source of infrared radiation, a body of crystalline semiconductor material the conductivity of which varies in accordance with the level of infrared radiation impinging thereon, a Dewar vessel, means mounting said semiconductor body within said vessel, a window in said vessel exposing said semiconductor body to said source, said window being constructed of a substance substantially transparent to infrared radiation, a source of biasing potential connected to said semiconductor body, filter means connected in series with said biasing potential and said semiconductor body, said filter means being adapted to attenuate signals having frequencies below the frequency of said infrared source, means for providing a potential sufficient to cause impact ionization of said semiconductor body, and means for applying said potential to said semiconductor body.

2. An infrared radiation detection system comprising, in combination, a source of infrared radiation, a body of photoconductive material, a body of semiconductor material, a Dewar vessel, a window in said vessel which is substantially transparent to infrared radiation, said window being exposed to said source, means for mounting said photoconductive body in said Dewar vessel in optical alignment with said source and said window, means for mounting said semiconductive body in said Dewar vessel intermediate said window and said photoconductive body, means for conducting electric current through said photoconductive body, a source of potential sufficient to cause impact ionization in said semiconductor body, means for applying said potential to said semiconductor body, and filter means connected in series with said photoconductive body, said filter means being adapted to attenuate signals having frequencies below the frequency of said infrared source.

3. An infrared amplification system comprising, in combination, a source of input infrared energy, a photodetector exposed to said energy, said photodetector including a body of a semiconductor material, a source of potential sufficient to cause impact ionization in said semiconductor body, means for applying said potential to said semiconductor body, means including said photodetector for generating a signal having an amplitude which is inversely proportional to the amplitude of said energy, means for generating a reference beam of infrared energy, a second body of semiconductor material positioned to intercept said beam, and means for modulating the transparency of said second body to infrared energy in accordance with the amplitude of said signal.

4. An infrared amplification system comprising, in combination, a source of input infrared energy, a photodetector exposed to said energy, means including said photodetector for generating a signal having an amplitude which is inversely proportional to the amplitude of said energy, said photodetector including a body of a semiconductor material, a source of potential sufficient to cause impact ionization in said semiconductor body, means for applying said potential to said semiconductor body, means for generating a reference beam of infrared energy, a Dewar vessel, said vessel including windows in opposing surfaces thereof which are substantially transparent to infrared energy, and said vessel being positioned such that said windows intercept said beam, a second body of semiconductor material mounted in said vessel in alignment with said windows, and circuit means for modulating the transparency of said second body to infrared energy in accordance with the amplitude of said signal.

5. An infrared amplification system in accordance with claim 4 wherein said circuit means comprises means for distorting said signal and means for applying the distorted signal to said second body.

6. An infrared amplification system comprising, in combination, a source of input infrared energy, a photodetector exposed to said energy, means including said photodetector for generating a signal having an amplitude which is inversely proportional to the amplitude of said energy, said photodetector including a body of semiconductor material, a source of potential sufficient to cause impact ionization of said semiconductor body, means for applying said potential to said semiconductor body, means for generating a reference beam of infrared energy, a Dewar vessel, said vessel including windows in opposing surfaces thereof which are substantially transparent to infrared energy, and said vessel being positioned such that said windows intercept said beam, a second body of semiconductor material mounted in said vessel in alignment with said windows, said second body being characterized by its transparency to infrared energy varying logarithmically with respect to the electric field strength across said second body over a limited range of field strength values, means for distorting variations in said signal in a manner complementary to the logarithmic transparency characteristic of said second body, and means for applying the distorted signal across said second body, thereby to vary the transparency of said second body to said beam in direct proportion to the amplitude of said signal.

7. An infrared surveillance system comprising, in combination, a source of infrared signals, infrared amplification means exposed to said source for amplifying said signals, first modulating means interposed between said source and said first amplification means, photodetecting means for converting infrared signals amplified by said amplification means to electrical signals, a photoemissive device for converting electrical signals to infrared energy, infrared sensitive recording means exposed to said photoemissive device, second modulating means interposed between said photoemissive device and said recording means, said first and second modulating means each comprising a body of semiconductor material, a Dewar vessel having windows in opposite surfaces thereof which are substantially transparent to infrared energy, and means mounting said semiconductor body in said Dewar vessel intermediate said windows, means for generating a potential sufficient to cause impact ionization of said semiconductor bodies, and means for applying said potential to said semiconductor bodies simultaneously.

8. An infrared surveillance system in accordance with claim 7 wherein said infrared amplification means comprises a photodetector exposed to infrared signals from said source, means including said photodetector for generating an electrical signal having an amplitude which is inversely proportional to the amplitude of said infrared signals, means for generating an output beam of infrared energy, a body of semiconductor material positioned to intercept said beam, and means for modulating the transparency of said semiconductor body to infrared energy in accordance with the amplitude of said electrical signal.

9. An infrared surveillance system in accordance with claim 8 wherein said means for modulating the transparency of said semiconductor body includes a Dewar vessel, means mounting said semiconductor body in said Dewar vessel, a nonlinear network for distorting said electrical signals, and means for applying said distorted electrical signals to said semiconductor body.

References Cited

UNITED STATES PATENTS

| 3,042,853 | 7/1962 | Steele | 307—307 X |
|---|---|---|---|
| 3,010,020 | 11/1961 | Alcock | 250—105 X |
| 3,114,041 | 12/1963 | Amsterdam. | |
| 3,239,605 | 3/1966 | Cholet et al. | |
| 3,258,602 | 6/1966 | Promish. | |

RALPH G. NILSON, *Primary Examiner.*

A. B. CROFT, *Assistant Examiner.*

U.S. Cl. X.R.

307—307; 332—3, 52